United States Patent [19]

Eneroth et al.

[11] Patent Number: 4,582,515

[45] Date of Patent: Apr. 15, 1986

[54] WET SEPARATOR FOR AND METHOD OF PURIFYING POLLUTED CONDITIONING AIR

[75] Inventors: Jan-Mats Eneroth; Osten Maatta; Roland Soderholm, all of Vaxjo, Sweden

[73] Assignee: Flakt Aktiebolag, Nacka, Sweden

[21] Appl. No.: 660,339

[22] Filed: Oct. 12, 1984

Related U.S. Application Data

[63] Continuation-in-part of Ser. No. 496,180, May 19, 1983, abandoned.

[30] Foreign Application Priority Data

May 24, 1982 [SE] Sweden .............................. 8203198
Jan. 21, 1983 [SE] Sweden .............................. 8300301

[51] Int. Cl.$^4$ ............................................. B01D 47/10
[52] U.S. Cl. ............................................. 55/89; 55/94; 55/228; 55/240; 55/276; 261/DIG. 54
[58] Field of Search ................... 55/90, 93, 94, 228, 55/223, 276, 238–241, DIG. 46, 89; 98/115 SB; 261/21, 112, DIG. 54

[56] References Cited

U.S. PATENT DOCUMENTS

| | | | |
|---|---|---|---|
| 2,267,426 | 12/1941 | Saunders et al. | 261/DIG. 54 |
| 3,168,030 | 2/1965 | Wilhelmsson et al. | 98/115 |
| 3,168,031 | 2/1965 | Wilhelmsson et al. | 98/115 |
| 3,347,024 | 10/1967 | Dock et al. | 55/241 |
| 3,748,830 | 7/1973 | Ross et al. | 55/228 X |
| 3,795,093 | 3/1974 | Gebhard et al. | 55/238 |
| 3,884,654 | 5/1975 | de Crevoisier | 55/240 X |
| 4,257,784 | 3/1981 | Gebhard et al. | 55/84 |
| 4,261,707 | 4/1981 | Bradshaw et al. | 55/228 X |
| 4,328,012 | 5/1982 | Telchuck et al. | 261/DIG. 54 |
| 4,345,921 | 8/1982 | Gustavsson et al. | 55/223 |
| 4,350,506 | 9/1982 | Otto | 261/DIG. 54 |

Primary Examiner—Charles Hart
Attorney, Agent, or Firm—Dann, Dorfman, Herrell and Skillman

[57] ABSTRACT

A wet separator for purifying polluted conditioning air and separating solid and semi-liquid particles therefrom, especially paint particles in the outlet of a spray painting booth. For this purpose, there is a series of outlets with surfaces converging in the direction of flow into a neck or throat which increases the speed of passing media and thus achieves mixing of air, water and pollutants. According to the invention, beyond the first outlet in the direction of flow there is a dispersing chamber for further mixing and atomizing the mixture, which chamber terminates in the direction of flow in the second outlet, which is designed as a venturi with a more extensively throttled venturi opening defined by a flange extending into said opening. The outlets may be interconnected by a guiding surface, on which a dispersing stream of water droplets, air and pollutions impinge with a flat angle of impact adjacent to the second outlet at the lower end of the guiding surface. The impact area provides a special disintegration zone in front of the second outlet serving as a sound absorbing cover. Alternatively intermediate outlets may cause tortuous flow through the dispersing chamber providing an extended path which retards transmission of noise from the final outlet back to the booth.

22 Claims, 6 Drawing Figures

WET SEPARATOR FOR AND METHOD OF PURIFYING POLLUTED CONDITIONING AIR

RELATED APPLICATION

This application is a continuation-in-part of our copending application Ser. No. 496,180, filed May 19, 1983 now abandoned.

FIELD OF THE INVENTION

The present invention relates to a wet separator, particularly as an outlet from a work space such as a spray painting booth, and more particular relates to a separator formed as a venturi outlet under the floor of the booth. The invention also relates to a method of purifying polluted conditioning air by means of a wet separator of the type set forth.

BACKGROUND OF THE INVENTION

It has been previously known to utilize one or several venturis as an outlet from spray painting booths, for instance, for spray painting automobile chassis. The venturis may be suitably disposed directly below or even at some distance from a grate-like floor, through which polluted conditioning air may pass to be funneled through said venturi, in which the air speed is increased considerably bringing about the special effect, that paint particles agglomerate and can be more easily taken care of in a subsequent separation procedure. According to usual practice water is circulated under substantially the entire grate-like floor and through the venturi, so that it is not stopped up by paint. The flowing water is conveyed through a collection chamber, wherefrom water is recirculated again to a reservoir or other receiver under said grate-like floor. Also the air can all or partly be recirculated.

In principle, such known solutions function satisfactorily to remove the pollutants, but present difficulties in cleaning the apparatus and produce a high-noise level, which can be very troublesome. Modifications reducing the noise level increase the difficulty in cleaning, and vice-versa. These factors can oppose one another and often do so, since a unit with a greater noise-muffling effect as a rule is difficult to clean, while a unit which is easily cleaned as a rule has a very high production of noise. Even in units having a lower production of noise, and even with impaired facility for cleaning, the noise is so high that it is troublesome for personnel must spend time in the spray painting booth or other work space being ventilated.

SUMMARY OF THE INVENTION

An object of the present invention is therefore to provide a wet separator, which reduces the production of a noise, and which, despite this, enhances the ability to separate out pollutants and is easy to clean and to maintain clean. Another object of the invention is to improve techniques in this technical field in various respects for example improving the ability for reutilization of the air and the flushing liquids and for saving energy.

These objects are achieved according to the invention by providing an improved wet separator of the stated type. Laboratory tests have shown that under otherwise identical operating conditions, a conventionally-designed wet separator has a noise level of about 82 db(A), while a wet separator according to the present invention reduces this level considerably. Only a fractional reduction in db(A) must be regarded as a substantial improvement, since it signifies an enormous relief for the personnel in the spray booth or other work space.

DESCRIPTION OF THE ILLUSTRATED PRIOR ART

Figure 1:
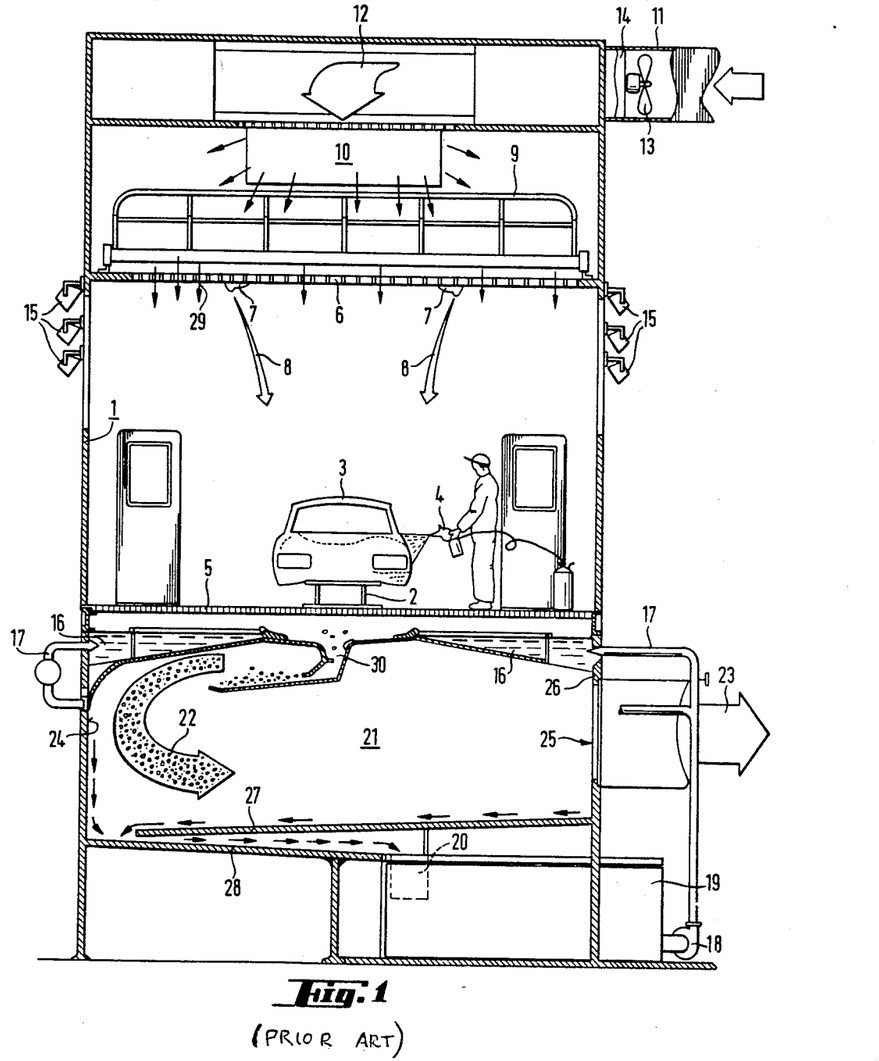
FIG. 1 shows in cross-section a conventional paint spray booth for spray painting of automobile chassis and with a conventional wet separator in the sub-floor area of the booth.

In FIG. 1, 1 designates a booth for spray painting objects, i.e. automobile chassis 3 by means of equipment 4, which objects are supplied by a conveyor 2. The booth has a grate-like floor 5.

The inner ceiling 6 of the booth is preferably perforated or provided with a filter layer along the whole width and can be equipped with air nozzles 7 for producing air curtains 8 having higher velocity than the partial currents of air 29 which pass through the perforations in the ceiling, the air flows 29 can vary between the personnel zones at the sides and the treatment area in the center of the booth.

Above the inner ceiling 6, there is an inspection bridge 9 and close-by this latter there is provided a filter and/or distributing device 10 for an incoming flow of air 12, which can enter through an inlet duct 11 having a fan 13 and suitable temperature setting and/or humidity control means 14. In FIG. 1, furthermore, a preferred lighting arrangement is designated by 15.

Below the floor 5, there are one or more reservoirs 16 for flushing liquid, which preferably are located along the sides of the spray booth and extend under the major portion of the floor 5. As an alternative to such reservoirs, there can be liquid receivers in the form of sloping surfaces inclined towards the center and continually flushed with the liquid. In both cases, the flushing liquid is conventionally suppled by supply pipes 17 leading from a pump 18 connected to a sump 19 fed from a drain trap 20. Suitable chemicals may be added to the water to dissolve or emulsify the paint so that its glue-like properties are reduced or eliminated.

Below said reservoirs or receiver surfaces, there is a separation chamber 21 for treating the flow of air 22 polluted with paint particles, which flow enters through a venturi 30. The venturi is an elongated opening having inclined side walls converging inwardly toward a center plane and a bottom wall intersecting the plane to divert the flow in a direction away from the center plane of the opening. A rebound wall 24 confronts the discharge from the venturi 30 and directs the air toward an exit 25 in a wall 26, where it is discharged at 23. A sloping bottom surface 27 is provided for the chamber 21 to collect the liquid and pollutant particles separated from the air in the chamber 21. A further bottom wall 28 slopes in the opposite direction in relation to surface 27 to discharge the separated liquid and pollutant into the drain 20.

FIG. 1 shows an asymmetric construction of the venturi 30, although symmetric constructions are also previously known. In the asymmetric construction, the outlet portion of the venturi is offset from the center plane so as to direct the air flow in one direction away from the center plane. In a symmetric construction, the outlet may discharge directly downward, preferably against a rebound or splash plate, or may be directed outwardly to both sides of the center plane. A choice between these constructions can be made according to factors such as available space and like circumstances. The invention can be applied to both constructions, although only the asymmetrical one is shown in the illustrated embodiments. When applying corresponding parts to a symmetric construction, true symmetry is not necessary and it is, of course, within the skill of the designer to design parts on the one side shorter or longer, higher or lower or with different sloping angles etc.

Conventional outlet construction has accordingly the draw-backs as mentioned in the initial part of the specification, i.e. relatively high noise production in combination with risk of sedimentation of paint particles especially in the inlet area of the venturi 30 and furthermore, in this case a lot of space is required for a separation chamber connected to the venturi, which chamber may be difficult or impossible to accomodate in within existing plants.

DETAILED DESCRIPTION OF THE PREFERRED EMBODIMENTS

Figure 2:
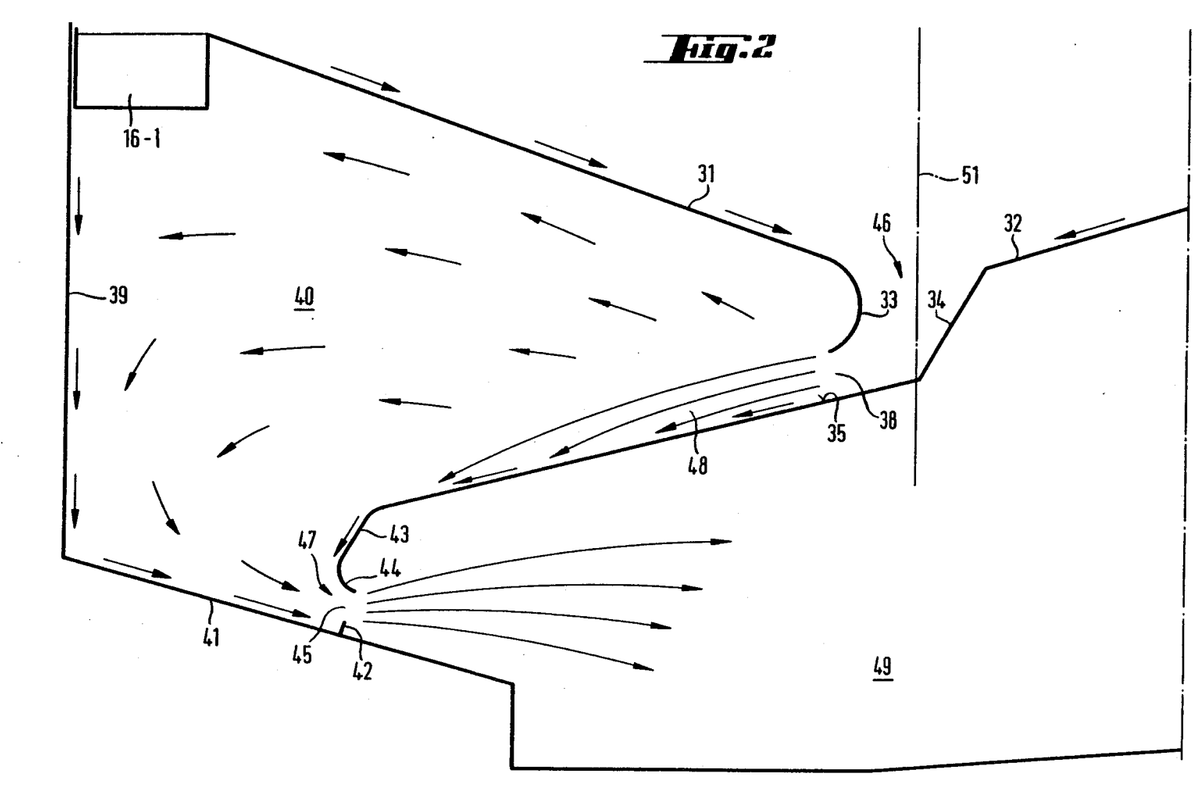
FIG. 2 is a fragmentary schematic cross-section of the sub-floor area of a booth having a first embodiment of a separator according to the invention with sloping water flow surfaces.

FIG. 2 illustrates the sub-floor area of a spray painting booth in which the flushing liquid receiver comprises a pair of reservoirs or pockets 16-1 along the side edges of the sub-floor which overflow onto the upwardly directed flushing surfaces of imperforate walls 31 and 32 underlying the grating and sloping or converging downwardly towards each other on opposite sides of the center plane 51 of a first outlet 46. In the present instance the center plane 51 of the outlet 46 coincides with the longitudinal center plane of the spray booth. The sloping walls 31 and 32 terminate in the outlet 46 approximately at the same level and merge respectively with a rounded outlet side 33 and a straight side 34. The rounded side 33 is convex and is bowed toward the center plane 51 but is spaced a substantial distance therefrom. As shown, the lower end of the side 33 terminates at a steep angle away from the center plane and is directed somewhat obliquely downwards. The straight side 34 preferably is disposed at an angle of between 30° and 40° to the center plane and terminates adjacent this plane below the bowed portion of the side 33 in a guiding surface 35 directed obliquely downward. The guiding surface 35 extends away from the center plane in the same direction as the terminal portion of the rounded side 33 to form an outlet neck 38 formed between the lower end of the wall 33 and the guiding surface 35. Although the neck is narrower than the distance between the sides 33 and 34, it is relatively wide as discussed more fully hereinafter. The convex curvature of the side 33 provides a smooth transition from the flushing surface of the wall 31 through the outlet 46 into the neck 38, minimizing disruption of the flow directed around the surface by the wall 34 and the guiding surface 35. Beyond the neck 38, the wall providing the guiding surface 35 extends downwardly at a slope in the range of 5° to 45° relative to the horizontal plane, preferably approximately 25°. The extension of the guiding surface performs a function which will be described more fully hereinafter.

The outlet neck 38 is effective to discharge the mixture passing through the outlet 46 into a dispersing chamber 40 formed between the wall 31 and the declining guide surface 35. The dispersing chamber 40 provides an abrupt enlargement of the flow area for the mixture of air, liquid and pollutants which issues from the neck 38. Adjacent the center line 51, the chamber is limited by the wall 33 and at the outer side, it is limited by a vertical rebound wall 39, the lower part of which forms a bottom wall 41 having a sloping surface pointing in the same direction as the flushing surface 31 and in a direction opposite to the guiding surface 35. The slope of the wall 41 is in the range of 10° to 45°, preferably approximately 20° with the horizontal plane. Between the guide wall 35 and the bottom wall 41, an outlet 47 is provided. The outlet 47 forms a second venturi and to this end the lower part of the guide surface 35 terminates in a wall segment 43 which cooperates with the bottom wall 41 to funnel the flow from the dispersion chamber 40 into a throat 45 of the outlet 47 which is defined between a convex curved wall 44 and a selectively-positioned flange 42 projecting at right angles to the bottom wall 41 to provide a restricted throat 45 for the venturi outlet 47.

Beyond the venturi throat 45, the bottom wall 41 may continue straight into a sump 49 which collects the liquid and pollutant particles ejected from the flow through the venturi throat 45. Such particles are discharged in a conventional way. The remaining air, as indicated by the arrows flows under the guide wall 35 and the flushing wall 32 to an outlet (not shown) similar to the outlet 25 of the prior art structure described above.

It should be noted that the vertical dimension of the dispersing chamber 40 increases as the distance from the center line 51 increases, causing a reduction in air speed. The rebound wall 39 causes the air to reverse its flow thereby depositing heavier particles of liquid and pollutants upon the rebound wall from which they may flow downwardly along the lower part 41 as indicated by the arrows into the outlet 47, where they may then be mixed again with the flow through the venturi throat 45. The flange means 42 assists in directing the flow of liquid and pollutants into the air flowing through the throat 45. The reduced neck portion 38 at the entrance to the dispersing chamber 40 creates a stream indicated by the arrows 48 which is concentrated with a mixture of liquid, air and pollutants. The stream extends in a flat bow along and over the extended guide wall 35 and and impinges against the wall at a position remote from the neck 38 with a small angle of impact which therefore disintegrates or atomizes the stream in the area adjacent the second opening 47.

Figure 3:
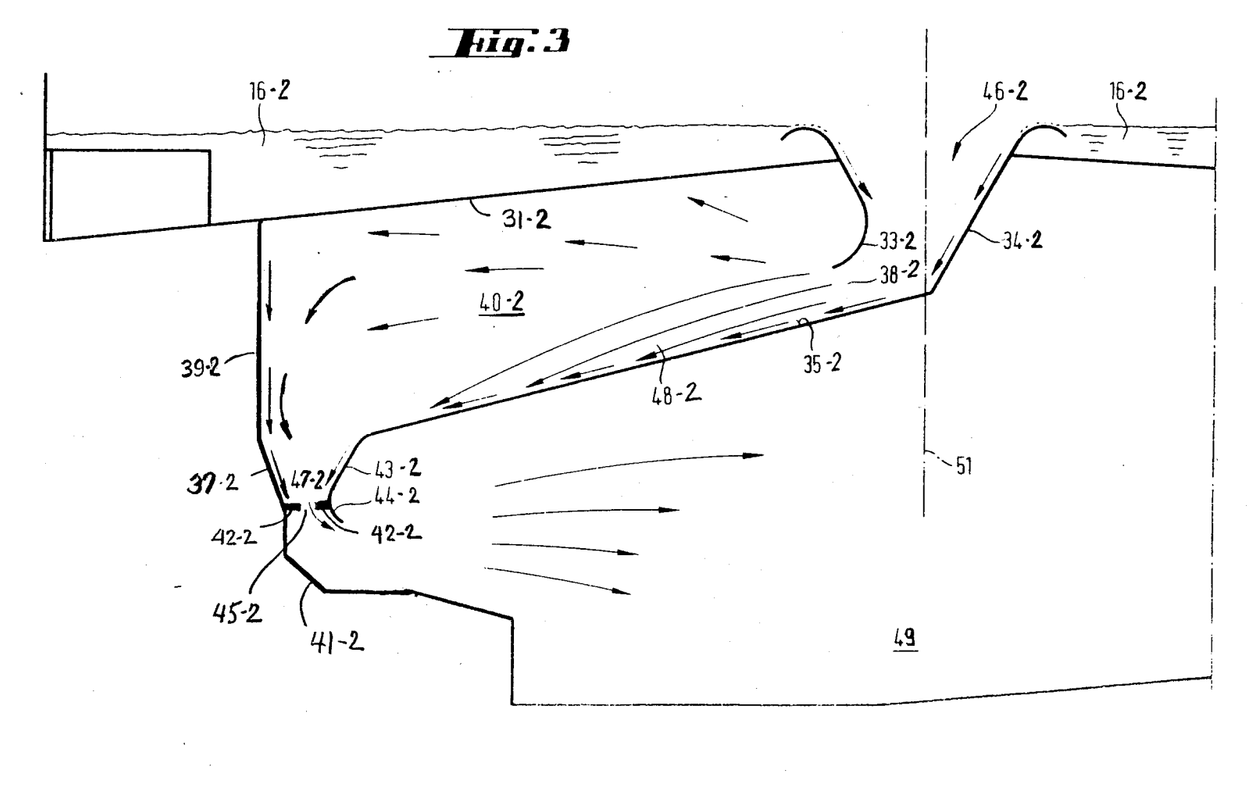
FIG. 3 is a view similar to FIG. 2 showing a second embodiment of a separator according to the invention with lateral water reservoirs.

The construction shown in FIG. 2 has proved to be highly effective in achieving the desirable results for a wet separator of the stated type. Since the first outlet 46 has a relatively wide free passage flow area and the second outlet 47 has a considerably smaller free passage area in the throat 45, and with the enlarging flow area provided in the dispersing chamber between the two outlets, the flow of air through the apparatus is controlled to produce good results. The first outlet 46 provides a smooth transition around the wall 33 without any sharp edges or projections into the flow, and since it has a relatively wide discharge opening at the neck 38, noise production at this area of the separator is kept low and, in fact, is substantially less than the noise production in comparable conventional plants. The restricted throat of the second outlet 47 provided by the flange 42 does result in increased noise production, as a result of the increase flow and the large pressure drop across the throat. However, the increase in noise is accompanied by a higher efficiency in atomization of the liquid and thereby separation of paint particles and other pollutants. Since the outlet 47 is positioned remotely from the work space in the booth above the floor 5, and is separated from the outlet 46 by the dispersing chamber 40, the noise produced at the outlet 47 is not transmitted into the booth where the human operators are working. The atmosphere in the dispersing chamber 40 is heavy-laden with water particles and pollutants, and thereby provides a barrier to the transmission of noise through the chamber. This effect is increased adjacent the outlet 47 by reason of the disintegration and atomization of the stream 48 adjacent thereto as discussed above.

The presence of a venturi effect in the first outlet 46 increases the air speed in this outlet which causes the air to entrain water drops from the film of liquid flowing into the outlet from the surfaces 31 and 32. The venturi effect mixes the water droplets with the polluted air flowing through the outlet and enables the droplets to agglomerate the particles of the pollutants in the air stream. In the second outlet, with the greater restriction at the venturi throat, there is a greater acceleration of the air stream so that the droplets entrained in the second outlet are smaller, almost fog-like, resulting in a highly efficient entrainment of the liquid at the second outlet.

In this connection, it should be noted that roughly 90% of all pollutants are readily and easily separated. The next 8% can be separated, but less easily, but the remaining part can cause great problems. Considering the quantity of air flow the absolute quantity of unseparated pollutants can be considerable. In laboratory tests the present invention has been effective to remove these difficult pollutants while providing adequate noise damping and ready cleaning which produces maximum effectiveness of the wet separation apparatus in all respects.

In connection with the stream 48, it should be noted that the bow in the stream results from the reduction in the speed of the air flow which causes the particle-laden air stream to drop against the surface 35 as the distance from the neck 38 increases. As the stream is disintegrated and the liquid is atomized by impact with the surface, the water and pollutant particles follow the surface as indicated by the arrows while the separated air and atomized liquid may rebound into the body of the dispersing chamber 40. The guiding surface 35 therefore is flushed with the water particles separated from the air flow in the stream 48.

Clearly the impact of the stream 48 will cause atomized water droplets to rebound from the surface 45 and form an intensive mixture of water droplets, paint particles and other pollutants and air in the vicinity of the second outlet and this mixture is swept through the outlet, achieving efficient separation, and at the same time providing a cover which serves to dampen the transmission of noise from the outlet 47 into the dispersing chamber 40, and from the dispersing chamber 40 through the outlet 46 into the work space of the spray painting booth. Thus the invention counteracts the increased noise production which accompanies the improved entrainment of liquid and pollutants into the air stream in the throat 45 of the outlet 47. It should also be noted that since the angle of impact of the stream 48 against the surface 35 is small, the production of noise by such impact is minimal compared with the noise production which would result if the stream were impacted against a surface at a large angle, for example 90°. For this reason, the surface 35 is extended so as to intercept the stream 48 and prevent its impacting directly on the bottom surface 41 beyond the outlet.

The flange 42 is selectively positioned in the outlet 47 to enable adjustment of the flow area of the throat 45. The adjustment may be accomplished by replacement of the flange 42 with larger- or smaller-width flanges or by inclining the flange 42 away from its right-angle relationship with the wall 41 or by adjusting its position toward or away from the opposite curved wall 44. Adjustment of this final outlet is desirable when the ventilation in the work space is changed, for example due to shutting down of one or more operations or other changes in the work which may make it desirable to change the quantity of ventilation air which is discharged from the work space through the outlet 46.

The present invention also provides a further advantage in connection with the separation of pollutants from the air. In a spray painting booth, it frequently occurs that the pollutants are concentrated in one area of the booth more than in other areas. In conventional wet separators, the wet separator in the floor under the highly polluted area is overutilized whereas the separator in the less polluted area is underutilized. In other words, the polluted flow through the outlet is neither homogeneous nor evenly distributed. Because of the present invention, the dispersing chamber 40 permits the non-homogeneous flow through the first outlet 46 to be thoroughly mixed within the dispersing chamber so as to produce a more homogeneous flow through the outlet 47, resulting in a higher degree of separation and a more uniform purification of the air discharged through the outlet.

It should also be noted that solvents or emulsifiers which may be added to the flushing liquid in the areas of high concentration of pollutants may affect the surface tension, rapidly altering the ability of the flow to entrain the flushing liquid. These localized changes may be overcome and equalized by reason of the presence of the dispersing chamber between the outlet 46 and 47.

In the embodiment shown in FIG. 3, the elements are similar to those shown in FIG. 2 except that the flushing liquid receiver 16-2 is similar to the receiver 16 of the prior art apparatus shown in FIG. 1. This form of the receiver causes the wall 31-2 at the top of the dispersing chamber 40-2 to be inclined reversely to the wall 31 of FIG. 2 so that the increase in height of the dispersing chamber 40-2 as the distance from the center line 51 increases is more gradual than the increase shown in FIG. 2. In this case the receiver 16-2 causes the flushing liquid to flow over a weir at the top of the outlet 46-2 and down the converging walls onto the convex wall 33-2 and the flat wall 34-2 of the outlet 46-2. The flat wall 34-2 terminates in a guiding surface 35-2 which intersects the center line 51 of the outlet 46-2 and passes under the convex wall 33-2 to form an outlet neck 38-2 which diverts the mixture of polluted air and flushing liquid towards the left as indicated by the arcuate arrows 48-2. The guiding surface 35-2 slopes downwardly similarly to the guiding surface 35 in FIG. 2 and the flushing liquid which is not entrained in the gas flow flows along the surface 35-2 towards a second outlet 47-2.

The dispersing chamber 40-2 gradually increases in height towards the rebound wall 39-2 after the abrupt increase in the cross section of the flow path provided by the enlargement of the path from the neck 38-2 into the dispersing chamber 40-2. As the flow impinges against the rebound wall 39-2, particulate matter and liquid are deposited on the wall 39-2 and flow downwardly as indicated by the arrows.

The second venturi outlet 47 has one side wall 43-2 which is formed as a lower part of the guiding surface 35-2 and which terminates in the second dispersing chamber overlying the sump 49, which is identical to the sump of the embodiment shown in FIG. 2. The other side wall of the venturi outlet 47-2 is formed by the converging wall portion 37-2 which is a lower part of the rebound wall 39-2. The walls 43-2 and 37-2 converge towards the center line of the venturi opening 47-2 and a restricted throat 45-2 is provided by oppositely-directed adjustable flanges 42-2 whose free edges determine the flow area in the throat of the venturi outlet 47-2. Beyond the throat 45-2, the mixture issuing from the throat impinges against the downwardly inclined wall 41-2 which leads into the sump 49, depositing liquid and particulate pollutants in the sump and permitting the gaseous components of the mixture to pass towards the outlet as indicated by the arrows above the sump 49. The inclination of the wall 41-2 below the outlet 47-2 is effective to direct the liquid and particulate pollutants along the wall into the sump.

Figure 4:
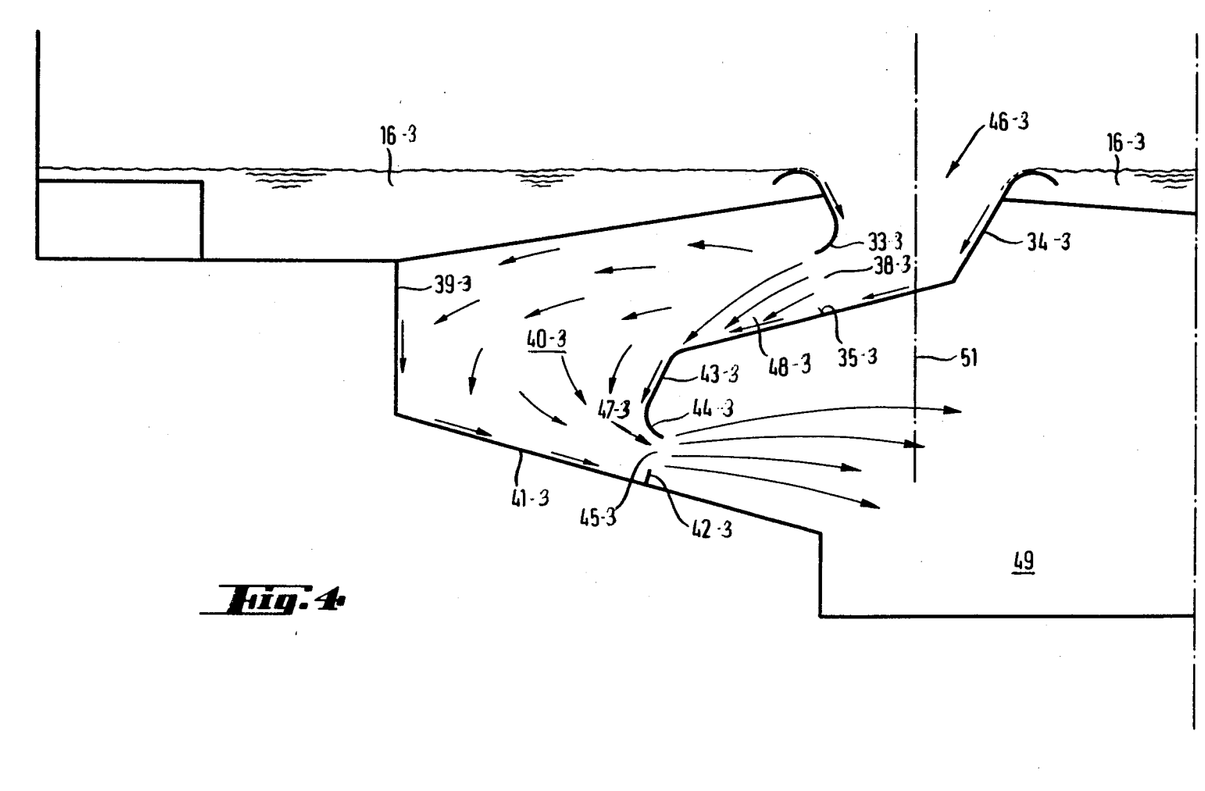
FIG. 4 is a view similar to FIG. 2 showing a third embodiment of a separator according to the invention which is especially adapted for use in a limited space.
Figure 5:
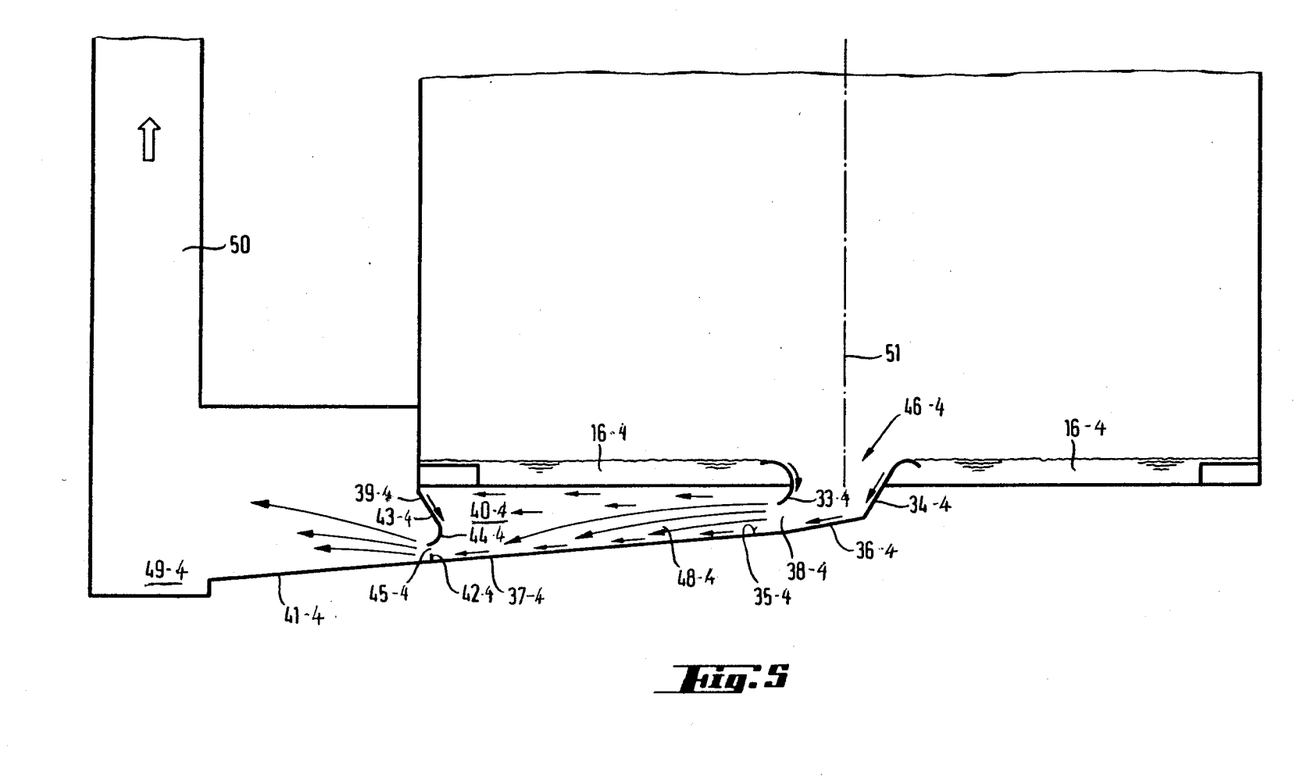
FIG. 5 is a view similar to FIG. 2 showing a fourth embodiment of a separator according to the invention for use in a plant with very limited height.

FIG. 4 illustrates a further embodiment which is similar to FIG. 2, but has been modified in order to accomodate the sub-floor structure to a more limited space. It should be noted that the flushing liquid receiver 16-3 is comparable to the receiver 16-2 of FIG. 3. Below the receiver 16-3, the sub-floor structure does not extend across the full width of the spray painting booth, and to this end, the rebound wall 39-3 is positioned at about one-half the distance between the side of the booth and the longitudinal center line 51 of the opening 46-3. The wall 39-3 defines the outer limit of the dispersing chamber 40-3 and in view of the foreshortening of the chamber 40-3, the outlet 46-3 is modified to provide a larger free flow area therethrough. Thus, the spacing between the walls 33-3 and 34-3 of the outlet 46-3 is wider than in the embodiment of FIG. 3 and the neck 38-3 is likewise larger than the neck 38-2 of FIG. 3. The larger flow areas causes the stream 48-3 to have a shorter trajectory and it will impinge upon the guide wall 35-3 closer to the center line 51. The walls 43-3 and 44-3 and the cooperating flange 42-3 are positioned beyond the point of impingement of the stream 48-3 so that the outlet 47-3 is closer to the center line 51. Preferably the throat 45-3 of the outlet 47-3 has the same restricted flow passage as the throats 45 and 45-2 of the previously described embodiments. It is apparent that the shorter throw length of the stream 48-3 causes impingement adjacent the outlet 47-3 to thereby provide the desired disintegration and atomization of the stream and formation of a sound-muffling cover for the outlet 47-3.

Where FIG. 4 illustrates an embodiment in which the width below the booth is limited, FIG. 5 illustrates an emodiment wherein the height below the booth is limited. In this embodiment of the invention, the flushing liquid receiver 16-4 has a uniform depth from the sides of the booth to the outlet opening 46-4 on the center line 51. The walls 33-4 and 34-4 are modified to reduce the height of the opening 46-4 and to this end the guide surface 35-4 is provided with a forepart 36 which has a somewhat steeper slope than the afterpart 37 which extends from the neck 38-4 to the second outlet defined by the throat 45-4. It is noted that the outlet throat 45-4 confronts the outlet neck 38-4 so that the air stream in the dispersing chamber 40-4 is not deflected into an S- or Z- shape path, such as results from the earlier-described embodiments. The second outlet is formed by the side walls 43-4 and 44-4 which are opposite the flange 42-4 at the throat 45-4. The flange 42-4 projects upwardly from the bottom surface 41-4 which extends beyond the flange 42-4 as a continuation of the guiding surface 35-4. The stream 48-4 from the neck 38-4 impinges against the guiding surface 35-4 adjacent the outlet throat 45-4 at a small angle of impact so that disintegration and atomization is achieved adjacent the second outlet and an efficient noise damping cover is provided in addition to the desirable mixing at the entrance of the second outlet. The wall 41-4 leads to a sump 49-4 and in this case an outlet conduit 50 extends upwardly from above the sump 49-4.

Figure 6:
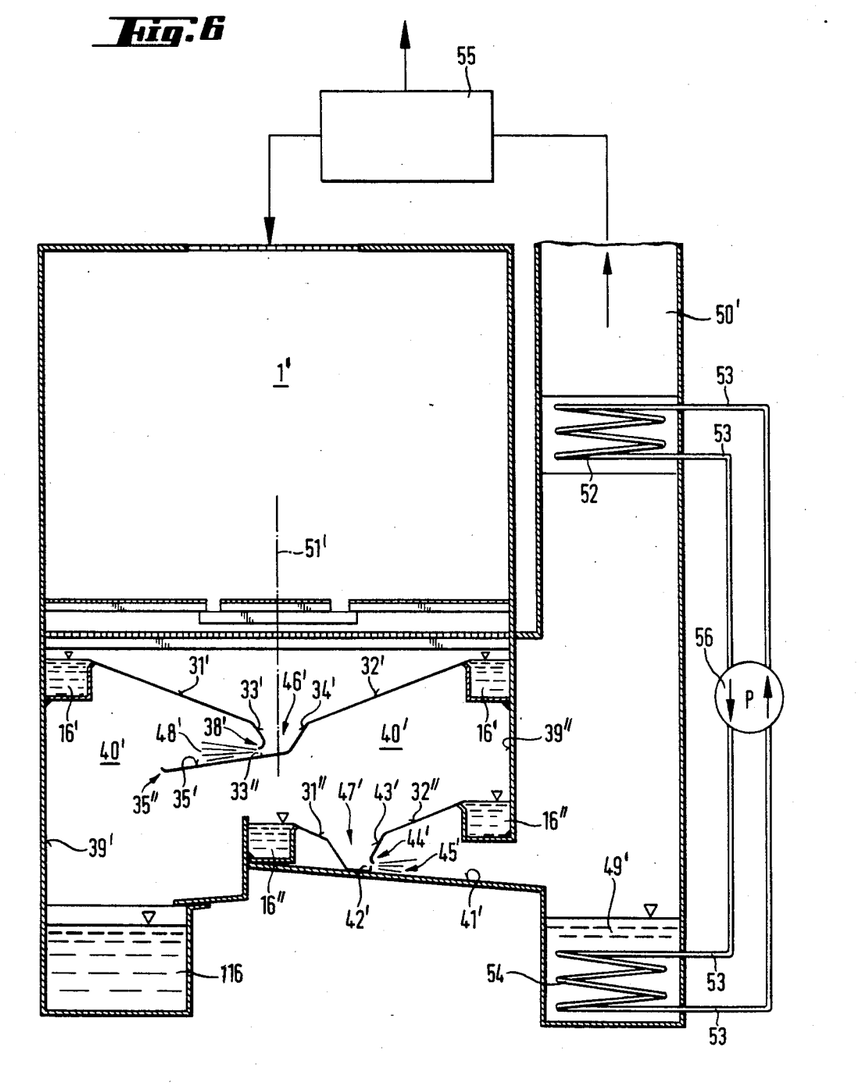
FIG. 6 is a diagrammatic cross-section of a paint spraying booth having in its sub-floor area a fifth embodiment of a separator according to the invention.

FIG. 6 illustrates a further embodiment in which the path of flow through the dispersing chamber is provided with plural reverse turns. To this end the wet separator of the present invention incorporates a series of outlets, the first and last of which are in the form of venturis to provide the desired dispersing effect. The intermediate outlet is effective to direct the flow in a first reverse turn to facilitate initial separation of particles from the flow for collection and removal from the dispersing chamber before the flow passes through the final outlet.

In FIG. 6, the work space 1', which may be a spray painting booth, is provided with a grate-like floor and elevated walkways or supports above the floor. The sub-floor area of the work space 1' has liquid receivers 16' and inwardly declining walls 31' and 32' similar to the embodiment of FIG. 2. The walls 31' and 32' converge to a first outlet 46' in the series of outlets. The outlet 46' is defined between converging walls 33' and 34' and guide wall 35', and has an outlet neck 38' at the terminal end of the wall 33. In this embodiment, a selectively positioned flange 33" is provided in the outlet neck 38' to regulate the free passage area of the neck and control the stream 48' generated by the flow through the neck. As in the embodiment of FIG. 2, the guiding surface 35' preferably has a downward slope with an angle of between 5° and 45° with the horizontal, preferably around 25°. The surface 35' extends beyond the neck 38' for a considerable distance and terminates in an upwardly bent free end 35" which cooperates with the rebound wall 39' to provide a second opening which separates the dispersing chamber into a forepart 40' and an afterpart 40". The bottom of the forepart 40 of the dispersing chamber is formed as a sump 116 which receives liquid and pollutant particles flowing down the rebound wall 39'. Below the guide plate 35', a passageway is provided into the after chamber 40" whose upper wall 32' provides the flushing surface previously described. It is noted that the after chamber 40" enlarges in height as the distance from the center line 51' increases, and is provided with a central outlet 47' which is in the form of a venturi having flushing surfaces 31" and 32" leading into the venturi throat 45' formed between venturi walls 43' and 44' on one side and a selectively-positioned flange 42' on the other side above the bottom surface 41. The surfaces 31" and 32" are flushed with a flushing liquid supplied by reservoirs 16" on opposite sides thereof. Preferably the venturi side 43' is disposed at an angle of 10°–60° with the vertical plane and terminates in a convexly curved portion 44' confronting the flange 42'. The bottom surface 41' leads into a sump 49' which underlies the outlet conduit 50' through which the purified air is exhausted.

As with the previous embodiments, the first outlet 46' has a relatively large free passage area whereas the final outlet 47' has a smaller free passage area. A dispersing chamber, in the present instance consisting of a forepart 40' and an afterpart 40" is provided therebetween.

In the present embodiment, the stream 48' discharged from the neck 38' impinges upon the upturned end 35" of the guiding surface to provide a noise-deadening cover adjacent the outlet formed between the guiding surface 35' and the rebound wall 39'. Furthermore, the extended space of the composite dispersing chamber provides further sound-deadening from the final venturi outlet throat 45' back through the chamber to the work space 1'.

The tortuous flow of the air through the dispersing chamber enables separation of liquid and solid particles from the flow as it is caused to take reverse bends in its passage through the dispersing chamber. The particles removed from the flow as it bends around the guide surface 37' are discharged into the sump 116 from which they may be removed in the conventional fashion. The particles removed in the afterpart 40" of the dispersing chamber are deposited on the flushing surfaces 31" and 32" for removal through the venturi throat 45', down the bottom wall 41' into the sump 49'. The upturned end 35" of the guide wall 35' ensures that the stream 48' does not impinge directly into the sump 116 and avoids disturbing the surface of the sump which might adversely affect the settling-out of the impurities therein.

The provision of a separate sump 116 which may feed the primary reservoirs 16' in conjunction with the sump 49' which may feed the auxiliary reservoirs 16" enables efficient management of the flushing liquid. It may be desired to provide different additives to the flushing liquid in the respective flushing surfaces so as to obtain a more efficient separation of the pollutants from the flow. The higher speed through the second venturi generates a greater pressure drop which provides maximum saturation of the flowing air with water vapor. Using colder water will facilitate condensing out of the water when the flow expands into the outlet channel 50' and thereby further improves the separation of pollutants from the air.

The colder water in the outlet 47' also reduces the temperature of the discharged air so that the water content of the air is diminished, effectively dehumidifying the exhaust air. Dehumidification is particularly desirable if the air is recirculated to the work space 1', as shown in FIG. 6. Before air is reintroduced into the work space, it should be filtered and warmed up to the temperature desired in the work space 1'. Heating in the present case is effected by a condenser 52 in a refrigerant circuit 53 of a heat pump 56, the evaporator 54 of which is preferably arranged to cool the water in the sump 49' of the final venturi outlet system. The conditioning of the recirculated air is effected in the conditioning unit 55 which may include filters and temperature and humidity controls with selective discharge or infusion of air from the atmosphere.

While it has been indicated as being desirable to avoid causing an impact of the stream 48' beyond the guide surface 35', where noise is not a significant factor, there may be advantages in providing extended impact of this type.

The various embodiments illustrated herein are not exhaustive and features from the various embodiments may be combined with one another to suit the particular operating conditions experienced in installation. The series of outlets shown in FIG. 6 have only the first and last outlets in the form of venturis, but it is within the scope of the invention to provide intermediate venturi outlets which may have flushing systems, possibly separate from one another. Furthermore the form of the final outlet of FIG. 6 may be used in the second outlets of the earlier-described embodiments.

While particular embodiments of the invention have been herein illustrated and described it is not intended to limit the invention to such disclosures, but changes and modifications may be made therein and thereto within the scope of the following claims.

We claim:

1. A wet separator for purifying polluted conditioning air discharged from a work space, comprising first and second venturi outlets for said air, and means to supply flushing liquid to the first outlet, said first outlet comprising an elongated opening having inclined side walls converging inwardly toward a center plane, one of said walls having an outwardly-diverging lower end as a lower extension of said inwardly converging portion thereof, said outlet having a bottom wall intersecting said center plane and extending below said lower end of the one wall to define an outlet neck where the polluted air and the flushing liquid are mixed with each other and diverted in a direction away from said center plane, said bottom wall having a first flange means in said outlet neck projecting from said bottom wall toward said lower end to insure said mixture of air and liquid in said neck, a dispersing and sound trapping chamber beyond said neck to receive the mixture discharged from said first outlet, said chamber having an upper wall spaced above said neck to provide an enlargement in the flow area for said mixture affording a reduction in air speed of the mixture of air and liquid discharged through said neck and a lower wall formed by the bottom wall beyond said flange, the flow area of said chamber terminating in said second venturi outlet, said second outlet having walls receiving flushing liquid and converging from opposite sides toward a throat in the outlet and second flange means in said throat projecting into said throat to define an outlet opening at the throat with substantially less free passage than the neck of said first venturi outlet, said second flange means directing flushing liquid into the flow through said throat, a second chamber downstream of said throat having a wall spaced from said center plane of the second outlet to provide an enlargement of the flow area for the mixture passing through said second outlet opening, the first outlet neck with said first flange means being effective to increase the speed and mixture of the polluted air and liquid passing therethrough, the dispersing and sound-trapping chamber being effective to disperse some liquid and pollutant particles in the passing air as it is reduced in speed, and the second venturi outlet with said second flange means opening being effective to give the passing air further increased speed and intensified mixture as it enters into said second chamber, and means providing separation of liquid and pollutants downstream of said second outlet.

2. A wet separator according to claim 1, wherein said upper wall has an upwardly-facing surface confronting said work space, said means to supply flushing liquid being operable to cause the flushing liquid to cover said surface and flow from said surface into said first outlet, said outlet having a vertical center plane, the other of said side walls in the first outlet being flat and sloping downwardly toward said center plane and terminating in said bottom wall, said bottom wall extending from said flat side wall through said neck, the said one side wall being convex and bowed toward said center plane, said convex side wall being smoothly curved and providing a smooth transition from said upwardly-facing surface through said outlet neck, the free space between said curved and flat side walls being greater than the free space through said neck.

3. A wet separator according to claim 2, wherein the inclination of said bottom wall is in the range of between 5° and 45° to the horizontal.

4. A wet separator according to claim 2, wherein the dispersing chamber is disposed immediately under the means to supply flushing liquid to the first outlet and has a vertical rebound wall opposite the outlet neck, having a lower part sloping downwardly into said second outlet.

5. A wet separator according to claim 4, including means directing flushing liquid along said lower part guiding surface, said second flange means comprising an upstanding flange on said lower part within the second venturi outlet.

6. A wet separator according to claim 1, wherein said first outlet has a vertical center plane, the bottom wall defining said neck directing the flow of polluted air and flushing liquid laterally away from said center plane, said dispensing chamber including a guiding surface connecting the first outlet to the second outlet, said surface being a continuation of said bottom wall of the first outlet and being inclined downwardly and having a lower part forming a wall of the said second venturi outlet.

7. A wet separator according to claim 6, wherein the inclination of said guiding surface and said bottom wall at the neck is in the range of between 5° and 45° to the horizontal.

8. A wet separator according to claim 6, wherein the dispersing chamber is disposed immediately under the means to supply flushing liquid to the first outlet and has a vertical rebound wall opposite the outlet neck, with a lower part inclined to the horizontal in a direction opposite to the inclination of the lower part of said guiding surface, whereby both of lower parts slope toward said second outlet.

9. A wet separator according to claim 1, wherein at least one of said flange means is a selectively-positioned flange projecting into the venturi opening at right angles to its center plane to define the venturi throat.

10. A wet separator according to claim 9, wherein said at least one venturi outlet has a curved wall confronting said flange to define the opposite side of the venturi throat.

11. A wet separator according to claim 1, wherein the configuration of the first and second chambers and the enlargements of the flow path in the chambers provide a flow path therethrough effecting separation of said dispersed particles from said passing air, at least one of said chambers having a bottom sump to collect liquid and pollutant particles separated from the passing air in said chamber.

12. A wet separator according to claim 1, wherein the first outlet is constructed to produce a dispersing stream extending in a flat bow towards said second outlet, the dispersing chamber having a wall adjacent the second venturi outlet in the path of said bow to receive the impact of said stream at a small angle so as to be disintegrated and to thereby further disperse and mix the components of said stream, the angle of said wall being selected to deflect a portion of said stream and simultaneously produce a noise-damping cover at the entrance to the second outlet.

13. A wet separator according to claim 1, including adjacent to the second outlet second supply means to supply flushing liquid to opposite sides of the second outlet, and separate sumps downstream of the two outlets respectively and means associated with each sump for recirculating flushing liquid to the respective supply means.

14. A wet separator according to claim 1, wherein the first outlet is constructed to produce a dispersing stream with a mixture of water, air and pollutants, and to direct said stream in a flat bow from said outlet, said chamber including a wall with a guiding surface extending from said first outlet underlying said stream and dividing said dispersing chamber into a fore chamber and an after chamber, said surface terminating in an upwardly-directed end portion adapted to intercept said stream and disintegrate the same to further disperse and mix the components of said stream prior to its passage into said after chamber, said second outlet being disposed in said after chamber.

15. A wet separator according to claim 14, wherein said second venturi outlet includes an outlet opening directing the flow through said second outlet away from the center plane of said second outlet into a second dispersion chamber downstream of said second outlet, and said second chamber has a vertical wall confronting said outlet opening and a sump between said opening and said wall.

16. A wet separator for purifying polluted conditioning air discharged from a work space, comprising first and second venturi outlets for said air, each of said outlets having a vertical center plane, and means to supply flushing liquid to the first outlet, said first outlet comprising an elongated opening having inclined side walls converging inwardly toward its center plane and receiving said flushing liquid, one of said side walls having an outwardly-diverging lower end, the other of said side walls terminating in a bottom wall intersecting said center plane and declining below said lower end of the one wall to define an outlet neck having an air passage where the polluted air and the flushing liquid are mixed with each other and diverted in a direction away from said center plane, flange means in said neck projecting into said air passage upwardly from said bottom wall toward the one wall, the flushing liquid from said other side wall flowing along said declining bottom wall and over said flange means to be deflected into the air passage of said neck, a dispersing and sound-trapping chamber beyond said neck terminating in an upright rebound wall having a lower part inclined toward the center plane of said second outlet to form one side wall thereof, said declining bottom wall terminating in a lower part oppositely inclined toward the center plane of said second outlet to form the other side wall thereof, said second venturi outlet receiving flushing liquid on the walls thereof and having a throat with substantially less free passage than the neck of said first venturi outlet, a second wall confronting said throat to receive the mixture passing through said second outlet opening, providing separation of liquid and pollutants from the mixture as it passes downstream of said second outlet, said wall being inclined to cause the separated liquid and pollutants to flow away from said second outlet.

17. A wet separator according to claim 16 wherein said second outlet also has flange means at said throat deflecting flushing liquid from the walls into the free passage area of said throat.

18. A wet separator according to claim 16 wherein the throat of said second outlet is in the center plane of said outlet and said second wall comprises an inclined bottom wall underlying said outlet throat.

19. A method of purifying ventilating air polluted with solid or semi-liquid pollutants discharged from a work space by means of a wet separator having at least two outlets in series with an enlarged dispersing chamber therebetween, the dispersing chamber having a guiding surface extending between said two outlets, each outlet having a restricted venturi throat forming an air passage, the final outlet in said series being remote from the first outlet, characterized by the steps of flowing a flushing liquid over the walls of the outlets and the guiding surface between the outlets, providing flange means deflecting the flushing liquid away from at least one wall into the air passage of each of the throats, mixing the discharged air and pollutants with said flushing liquid in the first of said series of outlets at a first air speed, causing the mixture to flow through the air passage of the first of said series of outlets with a small flow cross section to form a mixed stream and to direct the stream into the dispersing chamber and causing the flow cross section to enlarge and to pass at a reduced air speed to disperse some of the pollutants and liquid in the passing air, impinging said passing stream against said guiding surface in said dispersing chamber adjacent the second outlet to disintegrate the stream and produce a noise-damping cover for said second outlet and subsequently passing the air through the air passage of the final outlet of said series to form a smaller flow cross section than the first flow cross section and to mix the air and liquid with greater air speed than said first air speed to thereby produce a noise-generating pressure drop greater than the pressure drop through said first outlet.

20. A method according to claim 19 including the step of directing flushing liquid onto the walls of the second outlet upstream of its venturi throat and using flange means in the second outlet to form said throat and to deflect the flushing liquid from the walls into the air passage of the second outlet.

21. A method according to claim 19, including the step of supplying the first and final outlets in said series with flushing liquid from separate systems, and controlling the system for the final outlet to provide a substantially colder liquid temperature than in the first outlet.

22. A method according to claim 19 including the step of recirculating the air outgoing from the final outlet to the work space, and reconditioning the recirculated air to the temperature desired in said work space.

* * * * *